United States Patent [19]

Neary et al.

[11] 4,311,603
[45] Jan. 19, 1982

[54] SOLAR COLLECTOR WITH DARK SOLUTION

[76] Inventors: Michael P. Neary, 825 Calle Mejia, Apt. 934, Santa Fe, N. Mex. 87501; Thomas A. Wilson, 42 Reni Rd., Manhasset, N.Y. 11030

[21] Appl. No.: 22,734
[22] Filed: Mar. 21, 1979
[51] Int. Cl.³ ............................. C09K 5/00; F24J 3/02
[52] U.S. Cl. ..................................... 252/70; 126/900; 252/71; 252/582
[58] Field of Search .................... 126/900; 252/300 R, 252/71, 70

[56] References Cited

U.S. PATENT DOCUMENTS

| | | | |
|---|---|---|---|
| 4,056,090 | 11/1977 | Henriques et al. | 126/900 X |
| 4,083,490 | 4/1978 | Cunningham et al. | 126/900 X |
| 4,116,222 | 9/1978 | Seifried | 126/900 X |
| 4,170,984 | 10/1979 | Scheffee | 252/71 X |
| 4,221,210 | 9/1980 | Cvijanovich | 126/445 |
| 4,227,514 | 10/1980 | Spitzer | 126/426 |

FOREIGN PATENT DOCUMENTS 2403373  5/1979  France .................................. 252/71

Primary Examiner—Dennis L. Albrecht

[57] ABSTRACT

This invention relates to improvement of solar collectors of the type which gather thermal or sensible heat. Efficiency is increased through the present invention by selecting a fluid which
  (a) is optically dense
  (b) is water based
  (c) absorbs energy over a broad wavelength range
  (d) does not enter into photochemical or thermal reaction
  (e) has a lowered melting point
  (f) is not viscous
  (g) is neither toxic nor flammable.

This results in extremely high thermal collection efficiency.

4 Claims, No Drawings

SOLAR COLLECTOR WITH DARK SOLUTION

This invention relates to improved solar collectors of the fluid type which gather the thermal or sensible heat.

Thermal collectors generally suffer from the fact that only relatively low efficiency can be achieved.

In all (or at least most) common fluid type collectors that gather thermal or sensible heat, the thermal medium is not exposed directly to the sun light but rather a blackened copper or aluminium or etc. plate receives the solar radiation and is thus heated. The thermal fluid, being in intimate contact with the heater plate is thus heated. It is also often the case that glass plates (or any other suitably transparent material) are placed over the metal plate so that convective heat losses are reduced and so that the heated metal plate is also shielded from wind material and fabrication costs are high for this type of collector because extensive insulation and supporting framework are required in order to minimize heat losses (and in doing so increase the over-all efficiency) and because the collector is massive.

It is contemplated that a vastly improved fluid based thermal collector can be constructed. It is first necessary to realize that the efficiency of a common type of fluid based collector is an over-all efficiency and relates to the heat density times the fluid mass per exposure day divided by the total insulation. Therefore it is not a statement of optical efficiency but rather over-all collector efficiency. In fact, if the fluid is not exposed to the sun light it does not make sense to refer to optical efficiency except in a trivial way. It is, however, misleading to imagine that the highest possible optical efficiency is sought for all components that play a role in transmitting sunlight to the blackened metal plate. For if the sun light is not gotten to the plate it can hardly be absorbed and therefore stored!

The object of the present invention is a fluid type solar collector of increased efficiency.

A further object is such a collector capable of absorption over an increased wave length range.

Other objectives will be appreciated from the following description of the invention:

The present invention comprises, included in the water based collection fluid, certain additives which increase the absorption efficiency. If a fluid, that is a solution, containing an optically dense material is exposed to radiation of wavelengths that are absorbed molecularly, then as long as a photochemical or thermal reaction is *not* initiated, the radiation thus absorbed is thermalized, that is converted to heat. Therefore if such a solution can be formed that (a) is optically dense (i.e. extinction coefficient greater than $10^4$)

(b) is water based (c) absorbs over a side wavelength range (ca 300 to 1000 nm)

(d) does not enter into photochemical or thermal reactions (e) has a lowered melting point (f) is not too viscous (g) is neither toxic nor flammable when it is found that a very high thermal collection efficiency are possible.

As suitable examples, the following additives are effective:

EXAMPLE 1

$niSo_4 \cdot 6H_2O$ 27.6 gm/100 cc $H_2O$
path length 5 cm

EXAMPLE 2

$COSO_4 \cdot 7H_2O$ 8.4 gm/100 cc $H_2O$
path length 5 cm

EXAMPLE 3

$I_2$ 0.108 gm +
KI 0.155 gm/1000 cc $H_2O$
path length 1 cm

EXAMPLE 4

$K MnO_4$ 0.042 gm/100 cc $H_2O$ with the $CoSo_4 \cdot NiSO_4$ described above.

Though 4 formulations are given, there exist many more and the invention is not considered to be restricted to those formulations given.

It is further contemplated that by adding an inert salt (such as NaCl, etc.) the refractive index of the solution can be matched with that of the conduit containing the fluid.*

*This will eliminate the reflective losses that occur at the interface between conduits.

Furthermore added benefits arise from using salt solutions of the type described, such as:

(1) lowering of the melting point (2) higher heat capacity, thus allowing a smaller total volume of fluid due to the higher energy density, and therefore less tankage and insulation.

It is further contemplated that inexpensive clear plastic tubing* or sheets can be employed as conduits, thus deriving the benefits:

(1) lower cost for transparent material (2) less massive therefore less supporting structure therefore less cost (ca about ⅓ the mass of glass)

(3) lower heat capacity of plastic therefore less total insulation therefore less cost (4) higher over-all collector efficiency therefore less optical efficiency required (could be an economic trade-off)

(5) plastic in general resists scaling

*Even though some plastic may absorb a small part of the sunlight, that absorbed is also thermalized!

Such a collector could cost about ⅓ that of common collectors per ft² and exhibit twice the over-all collection efficiency.

It will be appreciated that many variations can be made within the scope of the invention and accordingly we intend to be limited only by the following Patent Claims:

We claim:

1. A solar collector of fluid type wherein said fluid comprises water and an additive dissolved therein such that said fluid plus additive is characterized by an extinction coefficient greater than $10^4$, absorbs over a wavelength from 300 to 1000 nm, and is neither toxic nor inflammable, said additive being selected from the group consisting of nickel sulfate hexahydrate, cobalt sulfate heptahydrate and iodine and potassium iodide.

2. A solar collector of the fluid type wherein said fluid comprises water and an additive in pollution therein, such that said fluid plus additive is characterized by an extinction coefficient greater than $10^4$, absorbs over a wavelength from 300 to 1000 nm, and is neither toxic nor inflammable, said additive comprising nickel sulfate hexhydrate.

3. A solar collector of the fluid type wherein said fluid comprises water and an additive dissolved therein such that said fluid plus additive is characterized by an extinction coefficient greater than $10^4$, absorbs over a wavelength from 300 to 1000 nm, and is neither toxic nor inflammable, said additive comprising cobalt sulfate heptahydrate.

4. A solar collector of the fluid type wherein said fluid comprises water and an additive dissolved therein such that said fluid plus additive is characterized by an extinction coefficient greater than $10^4$, absorbs over a wavelength from 300 to 1000 nm, and is neither toxic nor inflammable, said additive comprising iodine and potassium iodide.

* * * * *